Figure 1:
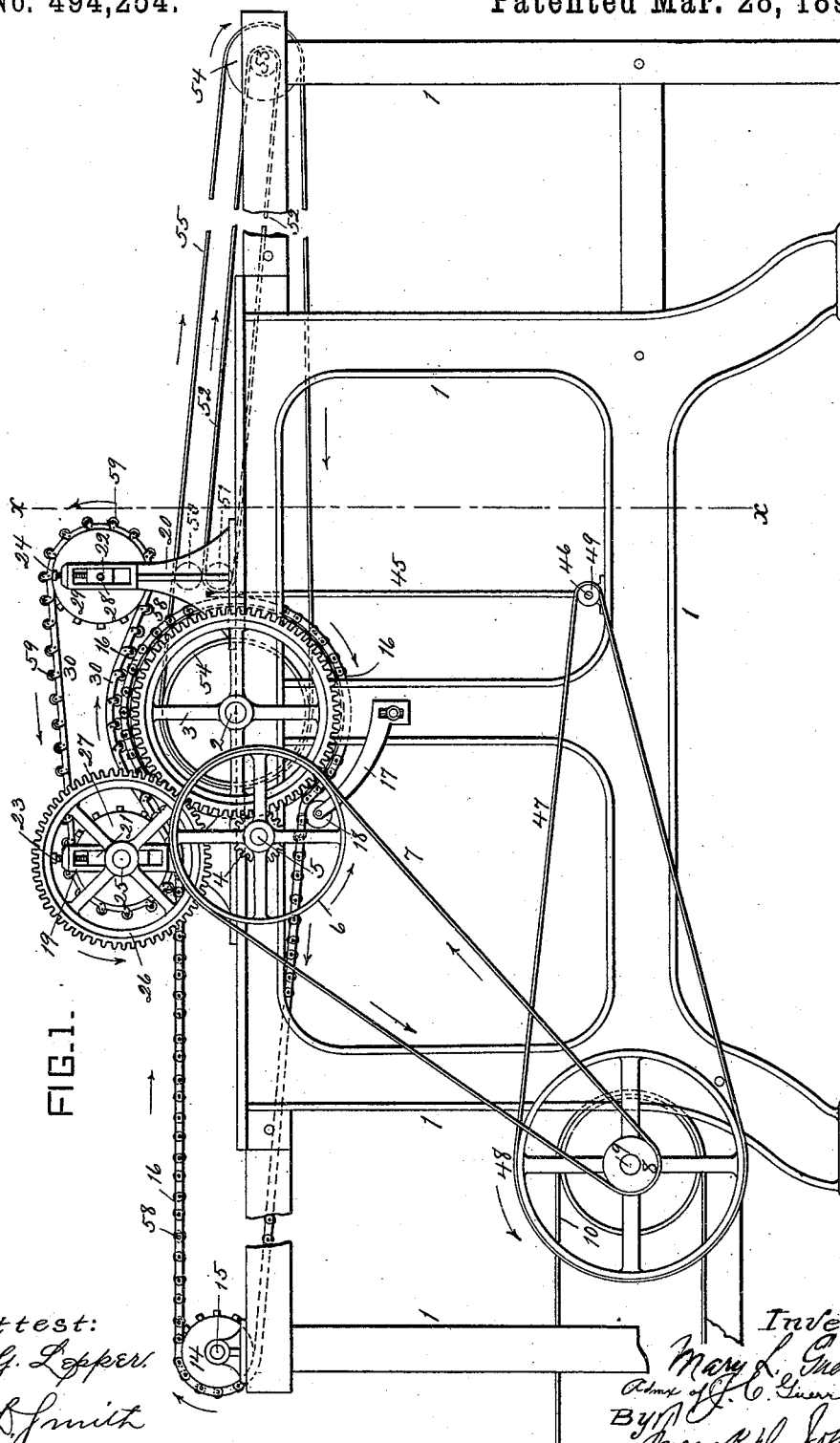

(No Model.) 4 Sheets—Sheet 1.

J. C. GUERRANT, Dec'd.
M. L. GUERRANT, Administratrix.
MACHINE FOR STEMMING TOBACCO.

No. 494,254. Patented Mar. 28, 1893.

(No Model.) 4 Sheets—Sheet 2.

J. C. GUERRANT, Dec'd.
M. L. GUERRANT, Administratrix.
MACHINE FOR STEMMING TOBACCO.

No. 494,254. Patented Mar. 28, 1893.

Attest:
J. G. Lepper
E. D. Smith

Inventor:
Mary L. Guerrant
Adm'x of J. C. Guerrant, dec'd.
By Franck D. Johns
Att'y.

THE NORRIS PETERS CO., PHOTO-LITHO., WASHINGTON, D. C.

(No Model.) 4 Sheets—Sheet 3.
J. C. GUERRANT, Dec'd.
M. L. GUERRANT, Administratrix.
MACHINE FOR STEMMING TOBACCO.
No. 494,254. Patented Mar. 28, 1893.
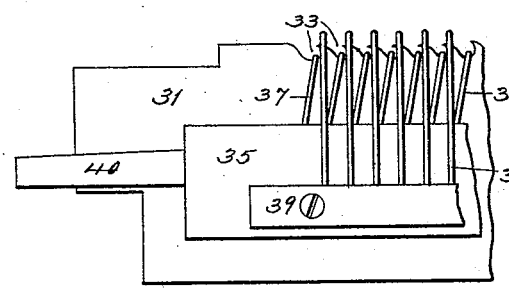
FIG.4.
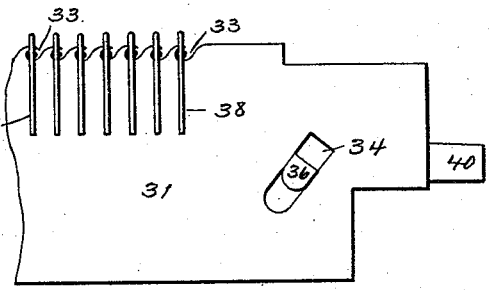
FIG.4.ᵃ
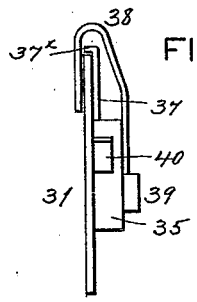
FIG.5.
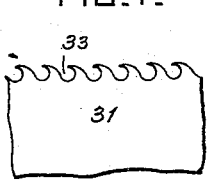
FIG.7.
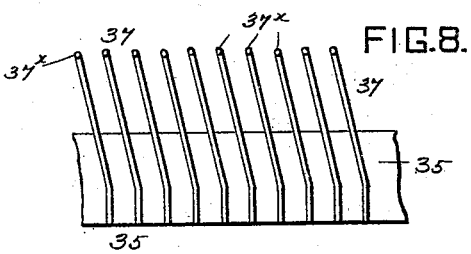
FIG.8.
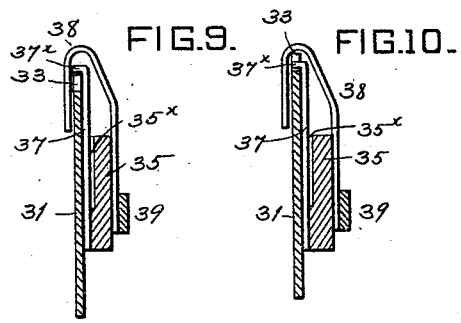
FIG.9. FIG.10.
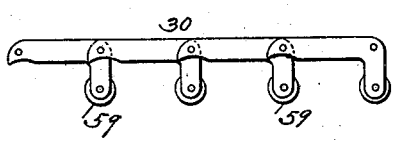
FIG.12.
Attest:
J. G. Lepper
E. D. Smith
Inventor:
Mary L. Guerrant
Admr. of J. C. Guerrant, dec'd.
By Franck D. Johns
Atty.

(No Model.) 4 Sheets—Sheet 4.
J. C. GUERRANT, Dec'd.
M. L. Guerrant, Administratrix.
MACHINE FOR STEMMING TOBACCO.
No. 494,254. Patented Mar. 28, 1893.
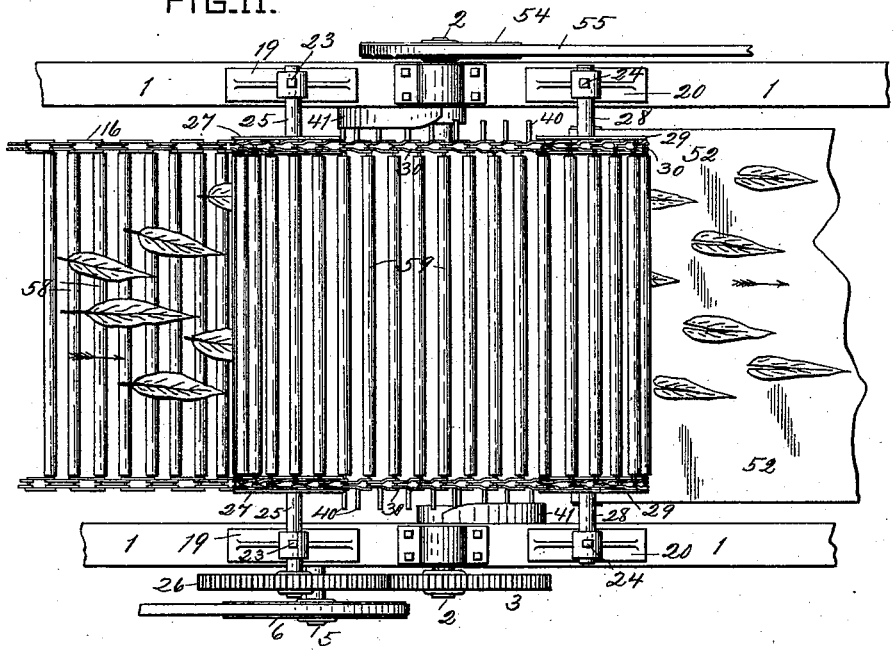
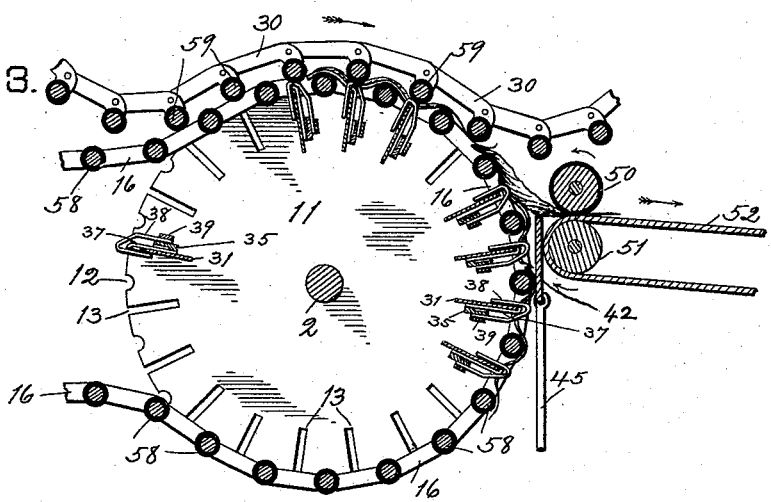

UNITED STATES PATENT OFFICE.

MARY L. GUERRANT, OF DANVILLE, VIRGINIA, ADMINISTRATRIX OF JOHN C. GUERRANT, DECEASED, ASSIGNOR TO THE GUERRANT-CABLE TOBACCO STEMMER COMPANY, OF SAME PLACE.

MACHINE FOR STEMMING TOBACCO.

SPECIFICATION forming part of Letters Patent No. 494,254, dated March 28, 1893.

Application filed March 29, 1890. Serial No. 345,925. (No model.)

*To all whom it may concern:*

Be it known that JOHN C. GUERRANT, deceased, late a citizen of the United States, residing at Danville, in the county of Pittsylvania, State of Virginia, did during his life-time invent certain new and useful Improvements in Machines for Stemming Tobacco; and I, MARY L. GUERRANT, administratrix of the estate of the said JOHN C. GUERRANT, do hereby declare the following to be a full, clear, and exact description of the invention, such as will enable others skilled in the art to which it appertains to make and use the same.

This invention relates to improvements in machines for stemming tobacco, and it has for its object to provide for automatically feeding the leaves of the plant, seizing the same and stems, and stripping the stems therefrom, and finally separating the stems from the leaves, as will more fully hereinafter appear.

The invention consists generally in the combination in a machine, of the class mentioned, of mechanism for feeding the leaves with mechanism for gripping the stems at different points along their lengths, and mechanism for separating the leaves from the stems and finally releasing the stems from the gripping devices.

The invention further consists in certain details of construction, whereby the successive steps above mentioned may be effected, as more fully hereinafter explained and specifically defined in the claims.

The objects above mentioned are attained by the means illustrated in the accompanying drawings, forming part of this specification, in which like reference numerals indicate similar parts in the respective figures.

Figure 2:
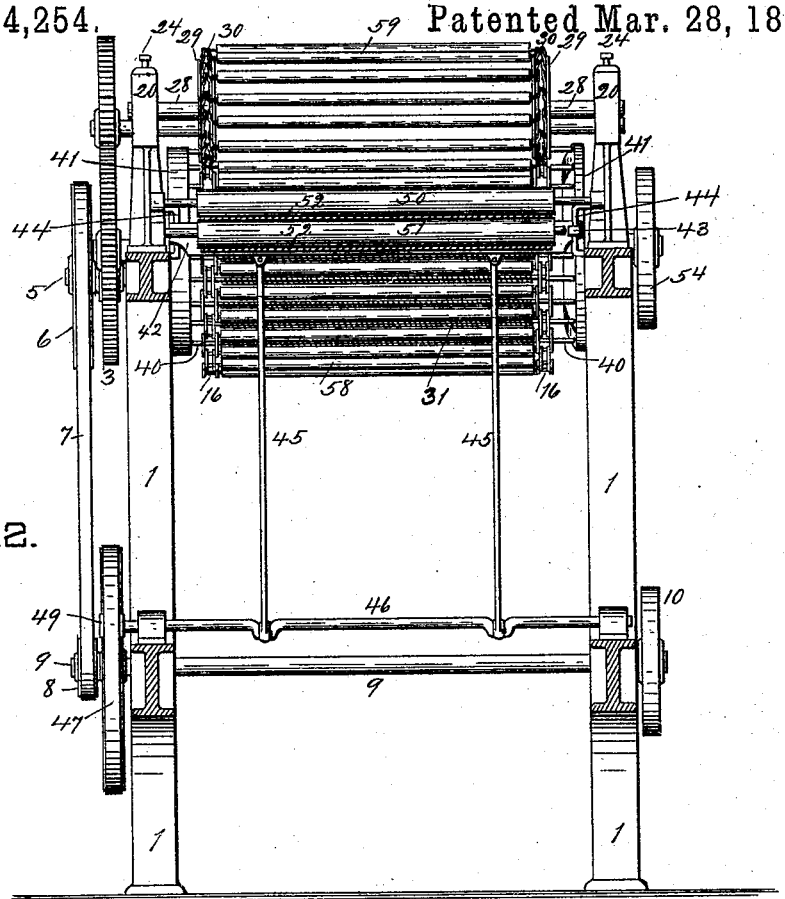
Figure 3:
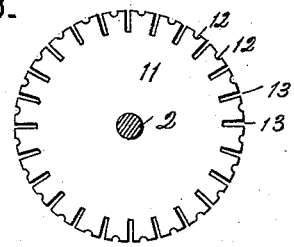
Figure 6:
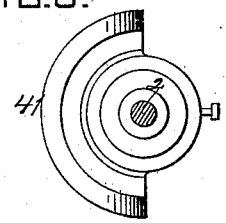
Figure 14:
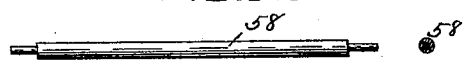

In the drawings:—Figure 1 represents a side elevation of a complete machine embodying the invention. Fig. 2 represents a transverse sectional view of a portion of the machine taken on the line x—x of Fig. 1. Fig. 3 is a detached enlarged view of one of the rotary heads which carry the seizing and gripping devices. Fig. 4 represents an enlarged view in side elevation of one of the seizing and gripping devices, detached. Fig. 4ᵃ represents a similar view showing the opposite side of the gripping devices. Fig. 5 is an end view of the seizing and gripping devices. Fig. 6 is a detached view of one of two cams, by means of which the reciprocating movement is given to the bar. Fig. 7 represents a side elevation showing a portion of a serrated plate, forming part of the seizing and gripping devices, detached. Fig. 8 is a similar view of a reciprocating bar, showing in connection therewith a series of seizing fingers, which serve in connection with the serrated bar to seize the stems previous to stripping them from the leaves. Fig. 9 represents a transverse sectional view of the serrated plate, the reciprocating bar and the guide and seizing fingers, showing the same in position about to seize the stems. Fig. 10 represents a similar view, showing the fingers in the position which they assume when the stems are seized and held. Fig. 11 represents an enlarged plan view of a portion of the machine, with the upper endless belt and its sprocket wheels in place. Fig. 12 represents a view in elevation of a portion of the upper endless belt. Fig. 13 is a partial longitudinal vertical section of the machine showing in side elevation one of the heads, and representing the tobacco leaves as being carried through the machine, their stems being seized by the gripping devices, some of the gripping devices being removed. Fig. 14, is a view in elevation of one of the rollers of the endless carrying chain.

Referring to the drawings, the numeral 1 indicates the main frame of the machine which is provided at the upper edges of its sides, about midway between its ends, with bearings in which a transverse shaft, 2, is journaled. The said shaft at one end has secured to it a driving wheel, 3, which is provided with gear teeth on its periphery, intergearing with the gear teeth of a pinion, 4, secured to a transverse shaft, 5, having its bearings in the sides of the main frame, 1, before mentioned, near the top thereof and at one side of the driving wheel, 3. The shaft, 5, at one end is provided with a band pulley, 6, over which passes a band, 7, which also passes under a smaller band pulley, 8, mounted on a transverse shaft, 9, journaled in bearings in the sides of the main frame, 1, and which receives its movement through the medium of a band, 10, from any suitable motor. To the shaft, 2, between its ends, and within the sides of the main frame, are secured, by means of bolts or otherwise, two circular heads or disks, 11, which are provided with sprocket recesses, 12, at suitable intervals in their peripheries, and with intermediate recesses or radial slots, 13, of greater depth.

The numeral 14 indicates two smaller wheels but one of which is shown in Fig. 1 mounted on a transverse shaft, 15, journaled at one end of the main frame, 1, the said wheels being provided with sprocket recesses at their peripheries corresponding to those in the heads, 11, and around said heads and wheels extend sprocket belts, 16, for the purpose hereinafter explained, the sprocket belts at their connecting links, being connected by means of transverse rollers, 58, the journals of which project at their ends, to the outsides of the belts and engage the sprocket recesses in the heads or disks, 11, the rollers serving with the belts to form an endless band by means of which the leaves are fed to the stemming mechanism of the machine.

The numeral 17 indicates two brackets secured to the sides of the main frame and carrying rollers, 18, which hold the lower portions of the belts, 16, closely against the lower portions of the heads, 11, the said brackets being slotted and adjustably confined by set screws so as to permit the belts to be tightened to the wheel, as desired. To the upper edges of the sides of the main frame are bolted or otherwise secured pairs of vertical standards, 19 and 20, having adjustable bearing blocks, 21 and 22, which are held in their seats by means of set-screws, 23 and 24. In the blocks, 21, is journaled a transverse shaft, 25, having mounted at one end a cog wheel, 26, having cog teeth intermeshing with the cog teeth of the wheel, 3, heretofore mentioned. The said shaft also carries sprocket wheels, 27, which are securely fastened to it. Between the blocks, 22, is journaled a shaft, 28, which has sprocket wheels, 29, secured to it, and over the wheels, 27 and 29, pass sprocket belts, 30, the tension of which may be regulated by the adjustable bearing blocks, 21 and 22. The said belts, 30, are constructed of links having transverse rollers, 59, similar to the rollers, 58, of the lower belts, the journals of said rollers projecting beyond the belts, so as to engage and be carried by the sprocket wheels, 27 and 29. The upper portions of the lower sprocket belts, 16, which pass over the peripheries of the heads, pass down under the sprocket wheels, 27, and are held to the heads thereby, the heads and the wheels, 22 and 29, occupying such positions relatively as to cause the adjoining portions of the two belts to curve upward over the heads, as clearly shown in Fig. 1 of the drawings. The rollers, 58 and 59, of the respective belts have their peripheries covered with rubber or other material which will yield to the leaves of the plant and not injure them while being carried forward.

The numeral 31 indicates a series of flat metal plates. These plates extend transversely from the opposite heads, 11, and are seated in the radial recesses or slots, 13, thereof, being confined in the said recesses by means of keys or other proper fastening devices. The plates at their projecting edges are serrated or provided with saw-like curved teeth, 33, all extending in the same direction toward one side of the machine. The said plates near their ends are provided with oblique slots, 34, which incline upwardly in the direction of the teeth.

The numerals 35 indicate a series of reciprocating bars which set loosely against the plates, 31, and at their sides, contiguous to said plates, are provided with headed bolts, 36, which work in the said slots when the bars are reciprocated, as more fully hereinafter explained. Each reciprocating bar 35, is of full width at the lower end, as shown in Figs. 9 and 10, and to this portion of each bar are secured at intervals in any desirable manner a series of inclined fingers 37, each finger being provided with an angular free end or projection $37^{\times}$. The bars 35 are each reduced in thickness at $35^{\times}$, to permit the fingers to slightly flex or yield as they are forced downward to grasp the stem of the tobacco leaf. The series of fingers are inclined in a direction opposite to the rake of the teeth on the upper edges of plates 31, and their projections $37^{\times}$, extend over the notches or spaces between said teeth. Each reciprocating bar carries a number of fingers corresponding to the number of notches between the teeth, and when the bars 35 are forced downward the projections $37^{\times}$ are forced into said notches and act to grasp the stems of the leaves, as will be hereinafter described.

The reciprocating bars, 35, on the outside are provided with a series of flexible fingers, 38, extending at right angles outward over the teeth of the plates, and corresponding in number with the teeth, the free ends of said fingers curving entirely over the serrated edges of the plates as shown, and being extended downward some distance on the opposite sides of the plates. The said fingers, 38, are confined to the reciprocating bar by means of a bar, 39, secured by screws or otherwise, or the fingers may be secured to the said reciprocating bars in any convenient manner. The ends of the reciprocating bars, 35, are provided with extensions, 40, which bear against the cam faces of two disks, 41, which are securely fastened to the insides of the main frame, 1, so as to surround the bearings of the main axle but not interfere with its movement. The disk located at the side of the frame, opposite to that in which the teeth of the serrated plates are directed, is arranged so that its cam surface will be below the axial line of the shaft to which the sprocket heads, 11, are attached, so that when the ends of the reciprocating bars, which are below the said axial line, in the course of the revolution of the heads, come in contact with the cam, they will cause the bars to move laterally and obliquely, so as to carry the fingers out of contact with the serrated edges of the plates. The disk at the other side of the machine has its cam above the axial line, so that, when the extensions of the reciprocating bars above said line are brought in contact with the cam, the fingers will be closed against the serrated edges of the plates, to seize the stems, ready to strip them from the leaves at the proper time. The cam disks are counterparts of each other, and the cam surfaces are in the form of half circles, rising outwardly from their ends to a point midway between their ends to give the proper movement to the fingers. The serrated gripping plates or blades and the seizing and guide fingers are so arranged between the heads, 11, that the serrated edges of the plates or blades and the gripping fingers will pass upward between the rollers, 58, sufficiently to grasp the stems on the lower surfaces of the leaves and carry the leaves forward to the stripping blade, the rollers of the upper belt pressing the leaves firmly, but with a yielding pressure to the gripping devices, so as to insure their proper action without injury to the leaves.

The numeral 42 indicates a transverse vertical blade, having guides, 43, near its ends, working on ways, 44, secured to the inside of the main frame. The said blade is located just at the rear of the sprocket heads, 11, and the sprocket chains mounted thereon, the upper edge of the blade being in approximately the horizontal axial plane of said heads, as shown. The lower edge of the said blade has connected to it two operating rods, 45, which also connect with cranks on a shaft, 46, operated by a band, 47, running over the pulley, 48, on the driving shaft and a small pulley, 49, on the said crank shaft, 46.

Just to the rear of the upper edge of the blade are mounted two rollers, 50 51, their plane of separation being about on line with the upper edge of the blade before mentioned. The upper roller, 50, is covered with rubber or other yielding material that will not injure the tobacco leaves in stripping them. Around the lower roller passes a belt, 52, which also passes around a roller, 53, at the rear of the machine, the shaft of said roller having a band pulley 54 receiving motion from a band 55 extending over a band wheel, 54, secured to the shaft of the sprocket heads of the machine.

Having fully described the construction of the improved machine, the operation thereof is as follows:—Tobacco leaves are placed with their stems downward and tips forward on the rubber covered rollers 58, connecting the sprocket chains 16, and are advanced by the endless belt composed of the parts just mentioned, beneath the rubber covered rollers 59 transversely connecting the links of the upper sprocket chains 30. It will be seen by reference to Figs. 12 and 13, that the rollers 59 on the downward projections of the links of the upper chains 30 are so disposed with relation to the rollers of the lower endless belt that they come opposite to, and tend by the pressure of the chains 30, to press downward slightly between said rollers 58, and it therefore follows that when a tobacco leaf placed on the rollers is advanced to a position beneath the sprocket wheel 27, the rollers 59, will begin to press it downward slightly as shown in Fig. 13 between rollers 58, and it will be conveyed in this manner by the two endless carrier belts over the guiding and gripping devices mounted in the revoluble heads 11. Bars 31 are so located in the slots 13 of heads 11, that their toothed upper edges 33, will lie in the spaces between rollers 58 and the rows of guiding and gripping fingers 38, 37$^\times$ are also between and project slightly up into the spaces between said rollers. Said devices being at this time in their raised positions as shown in Figs. 4, 5 and 9. As the rollers 59 strike the bent flexible ends of the guiding fingers 38, said ends will be depressed and the leaf resting thereon be carried downward with them, its stem being forced into a space between two of the teeth on bar 31. The end 40 of bar 35 now rides off from one of the cam surfaces 41, permitting said bar to move obliquely downward to cause the projections 37$^\times$ to grasp the stem and force it against the bottom wall of one of the spaces between the teeth 33 of bar 31. This action will be repeated by the succeeding guiding and gripping devices, as the heads 11, rotate until the stem of the leaf is seized and held at intervals along its length. It is now necessary to strip the leafy portions from the stem, and this is accomplished in the following manner. The tip of the leaf is flexible and naturally tends to stand at a tangent to the path of motion of the heads and devices carried thereby as they rotate downward, and is therefore in position to be caught between the rubber covered rollers 50, and endless belt 52, moving over roller 51; but to insure this position of the tip in case it should hang downward, the rapidly reciprocating blade 42 is provided, which will strike the tip and raise it until it is entered between the roller and belt. As will be seen the blade reciprocates in a space between the peripheries of heads 11, and the rollers 50 and 51, and as the heads move downward, or away from the now forwardly advancing tip, the blade will strike the sections of the leaf a series of blows which will assist in tearing them from the stem. At a point below and about opposite the axial center of the shaft 2, the ends 40 of bars 35, will come into contact with the other cam surfaces 41 and will be pushed obliquely upward thereby to withdraw the projections 37$^\times$, and release the stems which drop by gravity to the floor below. By providing a series of bars 31 and their connected gripping and guiding devices, the seizure of the stem at different points is insured no matter whether the leaf be laid in a straight or inclined position on the rollers 58. As the heads 11 are connected by bars extending transversely between; and as each bar is equipped with a similar set of seizing and guiding fingers the machine is adapted to strip the stems from a number of leaves at once, thereby greatly expediting the work.

Heretofore in all machines known to me the stem has been separated from the leaf by cutters, but in no case of which I am aware has it been seized at different points along its length and ripped or torn out of the leaf.

It is obvious that many changes could be made in the construction of this stem grasping and seizing device, and that the gearing could be widely varied without departing from my invention.

Having thus described the invention, what is claimed, and desired to be secured by Letters Patent, is—

1. The combination in a machine for stemming tobacco, of means for carrying the leaves along, means for seizing the stems of the leaves and means for tearing the leaf portions from the stems and delivering the same, substantially as described.

2. In a machine for stemming tobacco, the sprocket heads carrying serrated gripping blades, in combination with a series of guide fingers, and a series of gripping fingers, and mechanism for operating the same to seize and grip the ribs of the leaves, substantially as specified.

3. The combination in a machine for stemming tobacco, of a revolving shaft, heads carried by said shaft, fingers for holding up the leaf portions and between which the stems pass, and gripping devices acting to seize and hold the stems and mechanism for tearing the leaf portions from the stems and delivering the same, substantially as specified.

4. The combination in a machine for stemming tobacco, of a feeding belt, a revolving shaft, heads carried by said shaft, fingers for holding up the leaf portions and between which the stems pass, and gripping devices acting to seize and hold the stems and mechanism for tearing the leaf portions from the stems and delivering the same, substantially as specified.

5. The combination in a machine for stemming tobacco, of a revolving shaft, heads carried by said shaft, fingers for holding up the leaf portions and between which the stems pass and gripping devices acting to seize and hold the stems, and mechanism for tearing the leaf portions from the stems, and a delivery belt and roller, substantially as specified.

6. The combination in a machine for stemming tobacco, of two feeding and carrying belts between which the leaves are received, means for seizing the stems of the leaves and means for tearing the leaf portions from the stems and delivering the same, substantially as specified.

7. The combination in a machine for stemming tobacco, of the carrying belt composed of rollers with connecting links at their ends, means for seizing the stems of the leaves, and means for tearing the leaf portions from the stems and delivering the same, substantially as specified.

8. The combination in a tobacco stemming machine of means for supplying the leaves, fingers upon which the leaf portions rest and between which the stems pass, hooking teeth for engaging and holding the stems and mechanism for tearing the leaf portions from the stems and delivering the same, substantially as specified.

9. The combination in a tobacco stemming machine of means for supplying the leaves, fingers upon which the leaf portions rest and between which the stems pass, hooking teeth for engaging and holding the stems, means for pressing the stems into the hooking teeth and mechanism for tearing the leaf portions from the stems and delivering the same, substantially as specified.

10. The combination in a machine for stemming tobacco, of two feeding belts composed of transverse rollers, the rollers in one belt coming between the rollers in the other belt, means for seizing the stems of the leaves and means for tearing the leaf portions from the stems and delivering the same, substantially as specified.

11. The combination in a tobacco stemming machine of feeding mechanism, a revolving shaft with sprocket heads, blades with hooking teeth, bars and fingers adjacent to the teeth, means for moving the bars and grasping the stems and mechanism for tearing the leaf portions from the stems, substantially as specified.

12. The combination with suitable feeding devices, of a series of grippers adapted to seize the stem of a tobacco leaf at different points along its length, and means for tearing the leaf from the stem while held by the grippers, substantially as and for the purpose specified.

13. In a machine for stripping the stems from tobacco leaves, the combination with mechanism for feeding the leaves, of grippers for seizing the stems and means for tearing the leaves from the stems, substantially as shown and described.

14. In a machine for stripping the stems from tobacco leaves, the combination with a feeding device, of revoluble heads, toothed bars connecting the heads, and grippers for forcing the stem into the spaces between the teeth of the bars, substantially as shown and described, for the purpose specified.

In testimony whereof I affix my signature in the presence of two witnesses.

MARY L. GUERRANT,
*Administratrix of Jno. C. Guerrant, decd.*

Witnesses:
SALLIE B. HAMLIN,
LUCY M. HAMLIN.